United States Patent [19]

Baba

[11] Patent Number: 5,483,381
[45] Date of Patent: Jan. 9, 1996

[54] REVERSED GALILEAN FINDER OPTICAL SYSTEM

[75] Inventor: Toshiro Baba, Hachioji, Japan

[73] Assignee: Olympus Optical Co., Ltd., Tokyo, Japan

[21] Appl. No.: 186,599

[22] Filed: Jan. 26, 1994

[30] Foreign Application Priority Data

Jan. 29, 1993 [JP] Japan ................................. 5-013885

[51] Int. Cl.⁶ ............................. G02B 3/02; G02B 13/00
[52] U.S. Cl. ................................... 359/717; 359/744
[58] Field of Search ................................ 359/744, 717, 359/793, 399

[56] References Cited

U.S. PATENT DOCUMENTS

| | | | |
|---|---|---|---|
| 2,889,745 | 6/1959 | Hayes et al. | 359/744 |
| 3,971,052 | 7/1976 | Plummer | 359/744 |
| 4,650,293 | 3/1987 | Kimura . | |
| 4,832,470 | 5/1989 | Wakamiya | 359/744 |
| 4,834,472 | 5/1989 | Palmer | 359/744 |

FOREIGN PATENT DOCUMENTS

| | | | |
|---|---|---|---|
| 50-87027 | 7/1975 | Japan . | |
| 52-62023 | 5/1977 | Japan . | |
| 55-55829 | 1/1980 | Japan . | |
| 61-40087 | 7/1980 | Japan . | |
| 0093116 | 7/1980 | Japan | 359/744 |
| 320732 | 1/1988 | Japan . | |
| 0071822 | 4/1988 | Japan | 359/717 |
| 0300215 | 12/1989 | Japan | 359/744 |
| 0163509 | 7/1991 | Japan | 359/717 |
| 405002133 | 1/1993 | Japan | 359/744 |

*Primary Examiner*—Georgia Y. Epps
*Assistant Examiner*—Evelyn A. Lester
*Attorney, Agent, or Firm*—Cushman, Darby & Cushman

[57] ABSTRACT

A reversed Galilean finder optical system includes the first lens unit with a negative refracting power and the second lens unit with a positive refracting power. The second lens unit consists of a single positive lens in which the refracting power of the surface on the pupil side is higher than that of the surface on the object side. At least one surface of the positive lens is aspherical. Thus, the reversed Galilean finder optical system is constructed as the finder which has compact design and good performance.

7 Claims, 3 Drawing Sheets

REVERSED GALILEAN FINDER OPTICAL SYSTEM

BACKGROUND OF THE INVENTION

1. Field of the Invention

This invention related to a reversed Galilean optical system and, in particular, to a compact reversed Galilean finder optical system comprising two lens units of an objective and an eyepiece.

2. Description of the Related Art

A reversed Galilean optical system consists of an objective unit with a negative refracting power and an eyepiece unit with a positive refracting power. This optical system, although simple in arrangement, enables an image with a wide field angle to be observed at a time and thus has been used as a finder for cameras for a long time. Designating by $f_1$ and $f_2$ the focal lengths of the objective and eyepiece ulnas of the reversed Galilean optical system, respectively, the ratio between them, $-f_1/f_2$, indicates the magnification. The distance between the paraxial principal points of the optical system is determined by the sum of the focal lengths of its constituent lenses, $f_1+f_2$, which is paraxially the overall length of the optical system.

Based on the relationships stated above, the arrangement and technique for compact design of a reversed Galilean finder are set forth, for example, in Japanese Utility Model Preliminary Publication No. Sho 55-55829. This device is intended to downsize the reversed Galilean finder by reducing the focal lengths of its constituent lenses. Also, arrangements and techniques for improving the performance of the reversed Galilean finder by using aspherical surfaces in the objective units are mentioned in Japanese Patent Publication Nos. Sho 61-35533, Sho 61-40087, and Hei 3-20732, and Japanese Patent Preliminary Publication Nos. Sho 50-87027, Sho 52-62023, Sho 55-93116, and Sho 63-71822.

In the reversed Galilean optical system, where the magnification is determined as a precondition, the design of the optical system which decreases in overall length requires the use of the combination of lenses such that the focal length ratio between the objective and eyepiece units is constant and their focal lengths are reduced. If, however, the overall length of the optical system is diminished by such a combination, there is the problem of increasing the degree of correction for aberration in each lens. Further, even though the aspherical surface is used in the objective unit, it is impossible to completely correct for aberration produced in the eyepiece unit with accompaniment of the reduction of the overall length. Thus, there is a limit to compact design with full performance as well.

In the reversed Galilean finder, as mentioned above, the design of the finder whose overall length is reduced is very disadvantageous in view of correction for aberration, and the lens arrangement of some degree of length is essential for holding full performance. Moreover, the effective diameter required for the objective unit increases with increasing length of the lens arrangement. Hence, there is the problem that the finder, and therefore the entire camera, becomes bulky.

SUMMARY OF THE INVENTION

It is, therefore, an object of the present invention to provide a reversed Galilean finder optical system which reduces in overall length and has good performance, with a resultant compact camera of high performance.

The reversed Galilean finder optical system according to the present invention is constructed with, in the order from the object side, a first lens unit having a negative refracting power and a second lens unit having a positive refracting power. The second lens unit consists of a single positive lens, which has at least one aspherical surface and satisfies the condition $$|\phi_3| < |\phi_4| \tag{1}$$

where $\phi_3$ is the power of a surface on the object side of the single positive lens constituting the second lens unit and $\phi_4$ is the power of a surface on the pupil side of the single positive lens.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, reference is made to the functions of the reversed Galilean finder optical system according to the present invention. As stated in connection with the prior art, a method for compact design of the reversed Galilean finder optical system is to reduce the length of the lens arrangement by the combination of lenses such that the focal length ratio between the objective and eyepiece units is constant and their focal lengths is short. This method, however, overloads the whole of constituent lenses including the objective unit, and the attainment of compact design in excess of some degree and the possession of good performance are unreasonable in view of correction for aberration. In contrast to this, in the present invention, the compact design LSD intended by the bending of an eyepiece.

Figure 1:
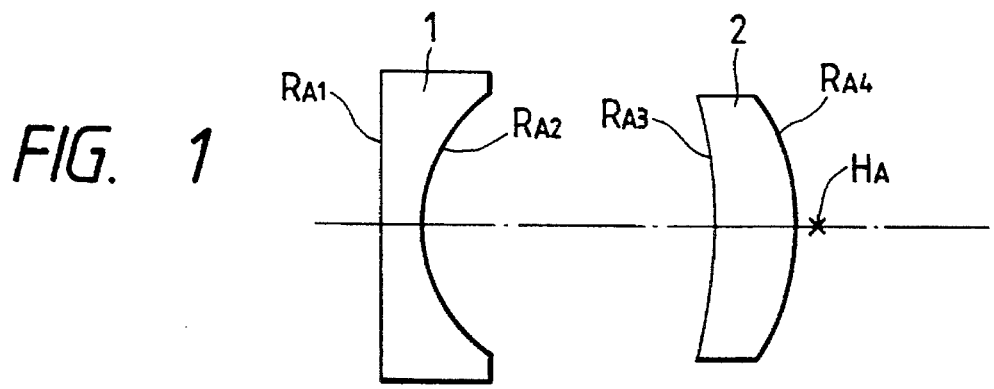
FIG. 1 is a conceptional view showing a reversed Galilean finder optical system according to the present invention.
Figure 2:
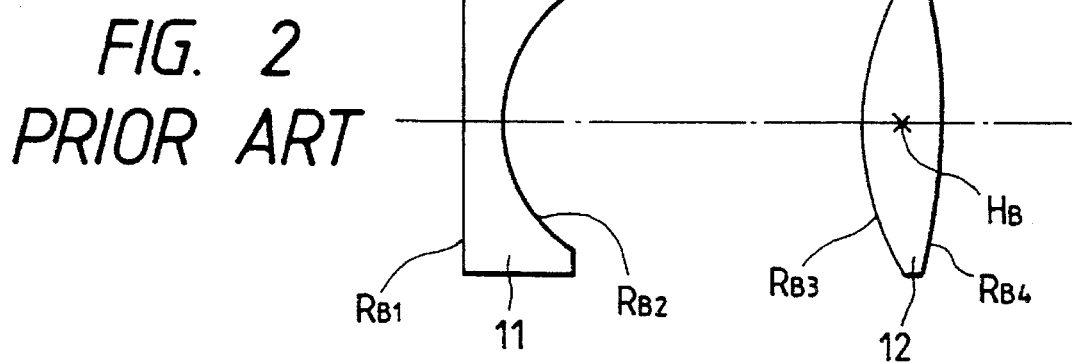
FIG. 2 is a conceptional view showing a reversed Galilean finder optical system of the prior art.

FIG. 1 is a conceptional view of the reversed Galilean finder optical system of the present invention. Reference numeral 1 denotes an objective lens as the first lens unit with a negative refracting power and 2 denotes an eyepiece as the second lens unit with a positive refracting power, which is a positive lens satisfying Eq. (1). The positive lens 2 is configured so that either a surface $R_{A3}$ on the object side or a surface $R_{A4}$ on the pupil side, or both, are aspherical. Reference symbol $H_A$ represents the principal point of the eyepiece (positive lens) 2. In FIG. 2 showing the conventional reversed Galilean finder optical system, reference numeral 11 designates an objective lens as the first lens unit with a negative refracting power and 12 designates an eyepiece as the second lens unit with a positive refracting power. Reference symbol $H_B$ represents the principal point of the eyepiece 12. Also, symbol R with the subscript refers to the refracting surface of the lens.

As mentioned and illustrated above, the eyepiece (positive lens) 2 constituting the reversed Galilean finder optical system of the present invention, unlike the eyepiece 12 constituting the conventional one, has the bending such that the refracting power of the surface $R_{A4}$ on the pupil side is higher than that of the surface $R_{A3}$ on the object side. The use of such bending makes it possible to shift the position of the principal point $H_A$ of the eyepiece (positive lens) 2 in the present invention toward the pupil, in comparison with that of the principal point $H_B$ of the eyepiece 12 in the prior art, when the position of the eyepiece is regarded as a reference. Since the length of the lens arrangement can thus be reduced as compared with the distance between actual principal points, it follows that the length of the lens arrangement can be reduced with respect to the focal lengths of the objective lens 1 and the eyepiece (positive lens) 2. At this time, the refracting power is concentrated on the surface $R_{A4}$ on the pupil side of the eyepiece (positive lens) 2, and hence the surface $R_{A4}$ suffers greatly from aberration. For an effective elimination of the aberration, it is required that at least one surface of the eyepiece (positive lens) 2 is made aspherical to constitute the reversed Galilean finder optical system.

In the reversed Galilean finder optical system of the present invention, when attention is given to the use of the aspherical surface of the eyepiece (positive lens) 2 as the second lens unit with a positive refracting power, the surface is shaped into such a form that the positive refracting power gradually declines from its center toward its periphery. In this way, aberration produced in the periphery is suppressed. It can be decided that the effect of compact design is great when a shape factor representative of the relationship of the radius of curvature between the surface $R_{A3}$ on the object side of the eyepiece (positive lens) 2 and the surface $R_{A4}$ on the pupil side satisfies the condition $$-5 \leq (r_4-r_3)/(r_4+r_3) \leq 0 \quad (2)$$

where $r_3$ is the radius of curvature of the surface $R_{A3}$ on the object side of the eyepiece (positive lens) 2 and $r_4$ is the radius of curvature of the surface $R_{A4}$ on the pupil side of the eyepiece (positive lens) 2. If the lower limit of Eq. (2) is passed ($<-5$), the refracting powers of both surfaces $R_{A3}$ and $R_{A4}$ of the eyepiece (positive lens) 2 will excessively increase, with the result that correction for aberration becomes incomplete. Conversely, if the upper limit of Eq. (2) is exceeded ($>0$), the refracting power of the surface $R_{A3}$ on the object side of the eyepiece (positive lens) 2 becomes greater than that of the surface $R_{A4}$ on the pupil side, and this eliminates the significance of the bending. When the eyepiece 2 is in particular shaped into a meniscus form, the position of its principal point can be shifted outside the lens system, and hence the length of the arrangement of the lens system is reduced to a minimum with a good effect.

Referring to the drawings, the embodiments of the present invention will be explained below.

Figure 3:
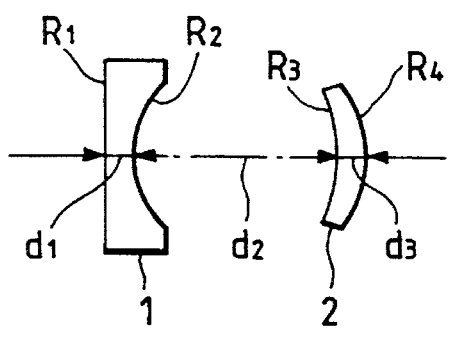
FIG. 3 is a view showing the arrangement of a first embodiment of the reversed Galilean finder optical system according to the present invention.
Figure 4:
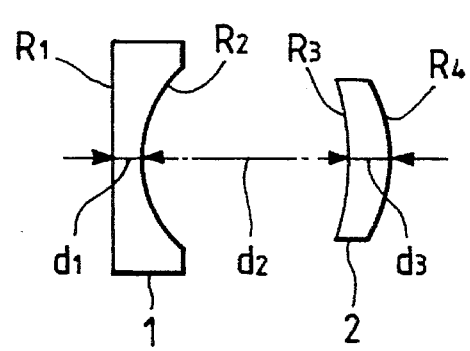
FIG. 4 is a view showing the arrangement of a second embodiment of the present invention.
Figure 5:
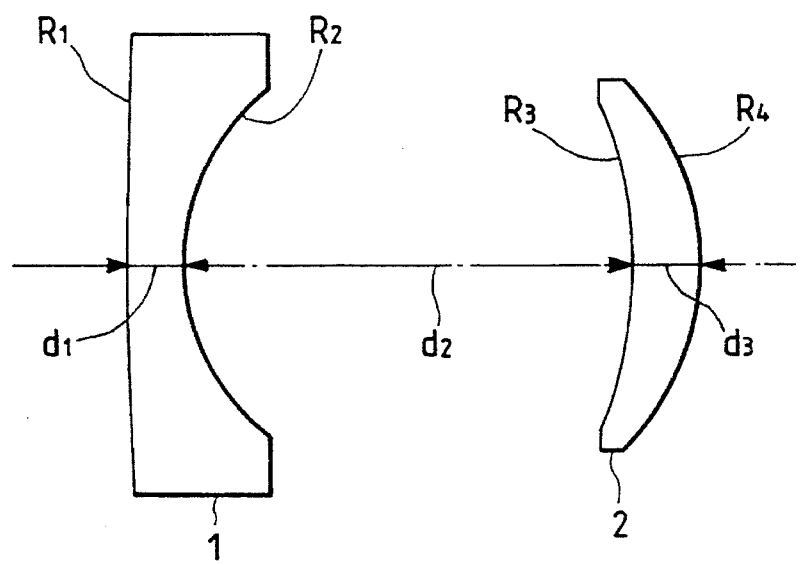
FIG. 5 is a view showing the arrangement of a third embodiment of the present invention.

FIGS. 3, 4, and 5 show the arrangements of the first, second, and third embodiments, respectively, of the reversed Galilean finder optical system according to the present invention. Each of the embodiments uses a single negative objective 1 as the first lens unit with a negative refracting power and a single positive eyepiece 2 as the second lens unit with a positive refracting power. The second lens unit with a positive refracting power, namely the positive lens 2, has the configuration of an aspherical surface. The configuration of the aspherical surface is expressed by $$X = (Y^2/r)/[1+\{1-(Y/r)^2\}^{1/2}] + EY^4 + FY^6 + GY^8 \quad (3)$$

where X is the coordinates in the direction of the optical axis, Y is the coordinates in the direction normal to the optical axis, r is the radius of curvature of the aspherical surface, and E, F, and G are aspherical coefficients.

The numerical data in respective embodiments are shown below (* indicates the aspherical surface).

First embodiment

Magnification $\beta=0.45\times$, Diopter $D=-0.5$ (1/m),

Maximum half angle of view of incidence $\omega=28.5°$,

Maximum effective diameter $H=14.8$ mm

Surface No. Radius of curvature r Space d Refractive index n Abbe's No. $\nu$ $R_1$ $r_1=190.6393$ $d_1=2.0$ $n_1=1.492$ $\nu_1=57.7$ $R_2$ $r_2=7.6302$ $d_2=16.0$ $R_3$ $r_3=-16.2110^*$ $d_3=2.43$ $n_2=1.492$ $\nu_2=57.7$ $R_4$ $r_4=-8.8874$ Aspherical coefficients

| E | F | G |
|---|---|---|
| $-0.96922 \times 10^{-4}$ | $-0.17143 \times 10^{-5}$ | $0.10094 \times 10^{-8}$ |

Value of Eq. (2)=$-0.29180$ $\phi_3=-0.03035$, $\phi_4=0.05536$

Second embodiment

Magnification $\beta=0.45\times$, Diopter $D=-0.5$ (1/m),

Maximum half angle of view of incidence $\omega=28.5°$,

Maximum effective diameter $H=14.8$ mm

Surface No. Radius of curvature r Space d Refractive index n Abbe's No. $\nu$ $R_1$ $r_1=-919.0119$ $d_1=2.0$ $n_1=1.492$ $\nu_1=57.7$ $R_2$ $r_2=8.0527$ $d_2=15.39$ $R_3$ $r_3=-20.6345$ $d_3=3.24$ $n_2=1.492$ $\nu_2=57.7$ $R_4$ $r_4=-10.0297^*$ Aspherical coefficients

| E | F | G |
|---|---|---|
| $0.46563 \times 10^{-4}$ | $0.11435 \times 10^{-5}$ | $-0.18585 \times 10^{-7}$ |

Value of Eq. (2)=$-0.34584$ $\phi_3=-0.02384$, $\phi_4=0.04905$

Third embodiment

Magnification $\beta=0.45\times$, Diopter $D=-0.5$ (1/m),

Maximum half angle of view of incidence $\omega=28.5°$,

Maximum effective diameter $H=15.0$ mm

Surface No. Radius of curvature r Space d Refractive index n Abbe's No. $\nu$ $R_1$ $r_1=157.7714$ $d_1=2.00$ $n_1=1.492$ $\nu_1=57.7$ $R_2$ $r_2=7.5550$ $d_2=16.0402$ $R_3$ $r_3=-16.24^*$ $d_3=2.4364$ $n_2=1.492$ $\nu_2=57.7$ $R_4$ $r_4=-8.8926^*$ Aspherical coefficients

|   | E | F | G |
|---|---|---|---|
| $R_3$ | $-0.10358 \times 10^{-3}$ | $-0.15937 \times 10^{-5}$ | $0.382161 \times 10^{-8}$ |
| $R_4$ | $-0.33500 \times 10^{-5}$ | $-0.73913 \times 10^{-7}$ | $0.19381 \times 10^{-9}$ |

Value of Eq. (2)=−0.29264

$\phi_3 = -0.03029$, $\phi_4 = 0.05533$

Figure 6:
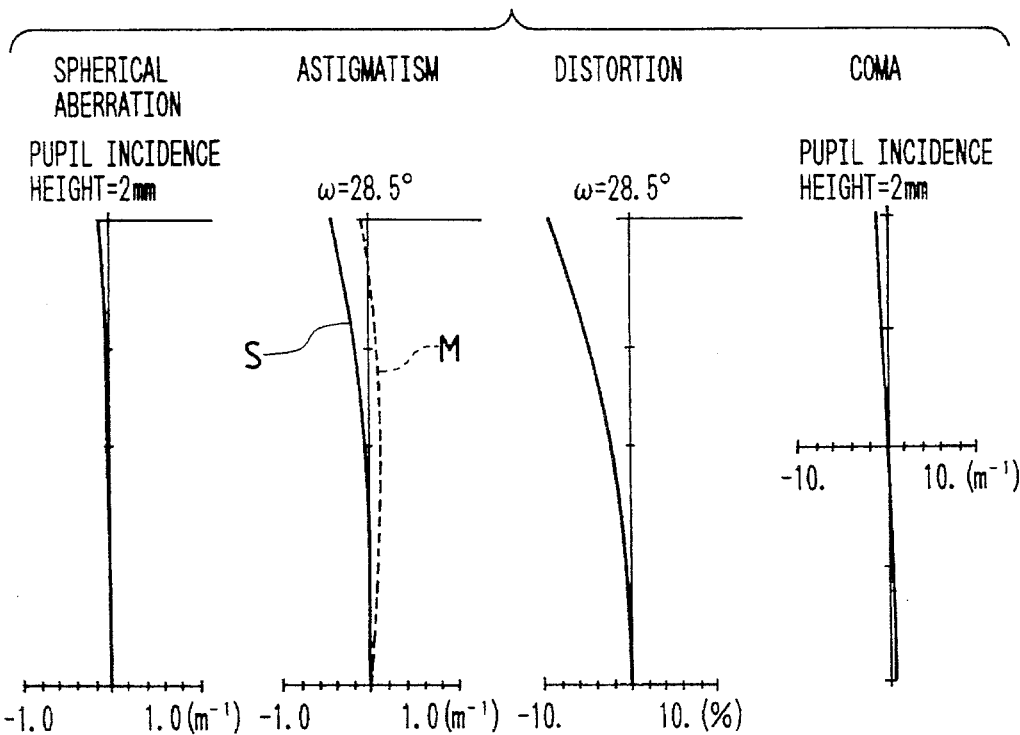
FIGS. 6, 7, and 8 are curve diagrams showing spherical aberration, astigmatism, distortion, and coma in the first, second, and third embodiments, respectively.
Figure 7:
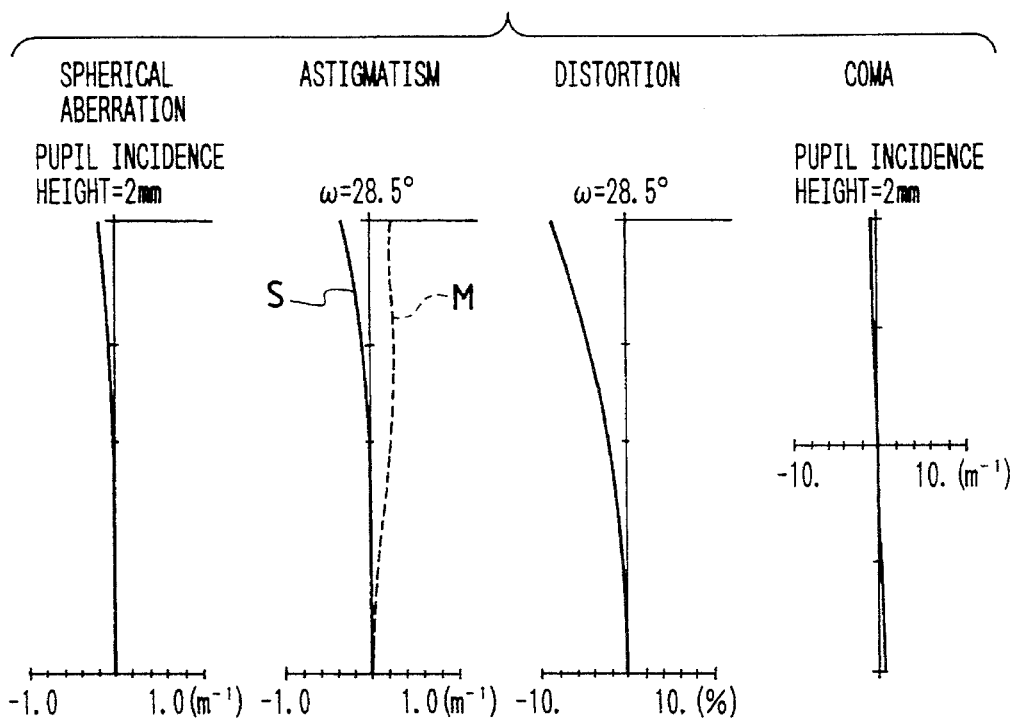
Figure 8:
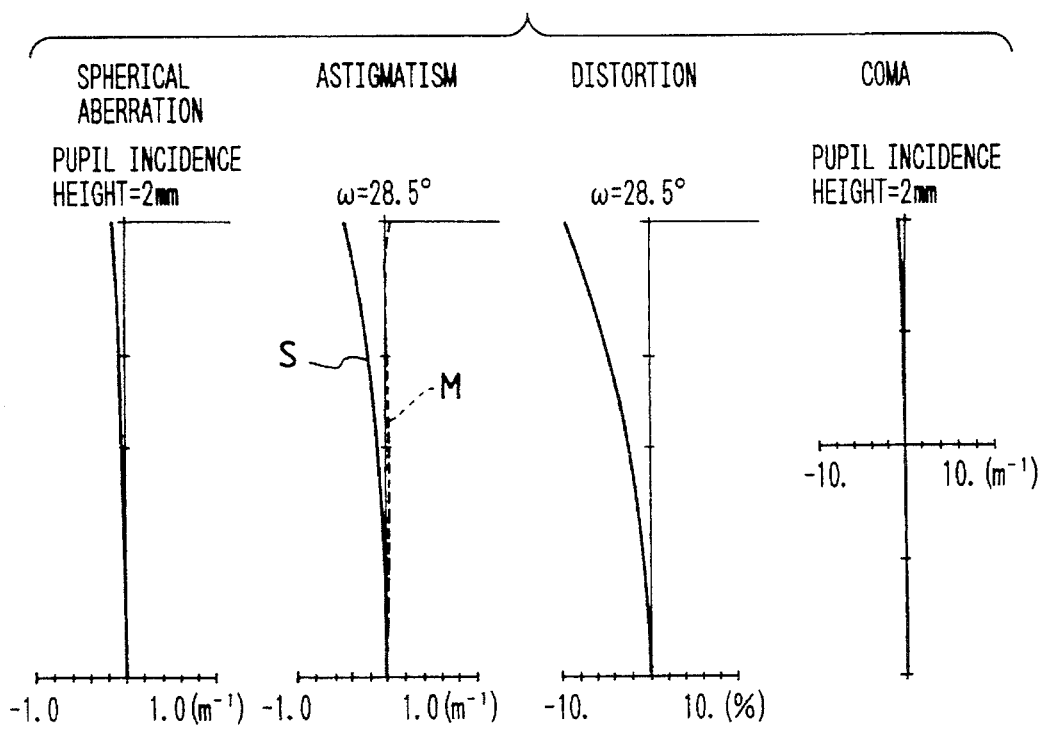

The aberration curve diagrams in the first, second, and third embodiments are shown in FIGS. 6, 7, and 8, respectively. In the curve diagrams of astigmatism, M represents the meridional image surface and S the sagittal image surface. Also, the curve diagrams of coma give the case where the half angle of view of incidence is 28.5°.

What is claimed is:

1. A reversed Galilean finder optical system consists of: in order from an object side, a first lens unit having a negative refracting power; and a second lens unit having a positive refracting power, wherein said first lens unit consists of a single negative lens and said second lens unit consists of a single positive meniscus lens whose concave surface is situated on the object side, said single positive meniscus lens having at least one aspherical surface.

2. A reversed Galilean finder optical system according to claim 1, wherein said aspherical surface is shaped into such a form that the positive refracting power gradually declines from a center of said aspherical surface toward a periphery of said aspherical surface.

3. A reversed Galilean finder optical system consists of: in order from an object side, a first lens unit having a negative refracting power; and a second lens unit having a positive refracting power, wherein said first lens unit consists of a single negative lens and said second lens unit consists of a single positive lens, said single positive lens having an aspherical surface on the object side and satisfying a condition $$|\phi_3| < |\phi_4|$$

where $\phi_3$ is a power of a surface on the object side of said single positive lens constituting the second lens unit and $\phi_4$ is a power of a surface on a pupil side of said single positive lens.

4. A reversed Galilean finder optical system according to claim 3, wherein said single positive lens has an aspherical surface on a pupil side.

5. A reversed Galilean finder optical system according to claims 3 or 4, wherein a shape factor representative of a relationship of a radius of curvature between the surface on the object side of said single positive lens and the surface on the pupil side of said single positive lens satisfies a condition $$-5 \leq (r_4 - r_3)/(r_4 + r_3) \leq 0$$

where $r_3$ is a radius of curvature of the surface on the object side of said single positive lens and $r_4$ is a radius of curvature of the surface on the pupil side of said single positive lens.

6. A reversed Galilean finder optical system according to claims 3 or 4, wherein said single positive lens is a single positive meniscus lens having a concave surface on the object side.

7. A reversed Galilean finder optical system according to claim 6, wherein said aspherical surface is shaped into such a form that the positive refracting power gradually declines from a center of said aspherical surface toward a periphery of said aspherical surface.

\* \* \* \* \*